United States Patent
Yamaguchi et al.

(10) Patent No.: US 6,693,676 B2
(45) Date of Patent: Feb. 17, 2004

(54) MOTION DETECTING APPARATUS FOR DETECTING MOTION INFORMATION OF PICTURE WITHIN SIGNAL

(75) Inventors: Noriyuki Yamaguchi, Tokyo (JP); Masaaki Hanai, Tokyo (JP); Akira Okumura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 414 days.

(21) Appl. No.: 09/832,195

(22) Filed: Apr. 11, 2001

(65) Prior Publication Data

US 2002/0008785 A1 Jan. 24, 2002

(51) Int. Cl.⁷ ............................. H04N 7/01; H04N 5/21
(52) U.S. Cl. ....................... 348/452; 348/620; 348/700
(58) Field of Search ................................. 348/701, 663, 348/669, 670, 620, 451, 452, 607, 625, 630, 628, 629, 624, 699, 700, 702; 382/236, 266; H04N 9/64, 5/14, 5/21, 9/77, 9/78, 7/01, 11/20

(56) References Cited

U.S. PATENT DOCUMENTS

| | | | | |
|---|---|---|---|---|
| 4,090,221 A | * | 5/1978 | Connor | 348/620 |
| 4,296,436 A | * | 10/1981 | Achiha | 348/620 |
| 4,500,911 A | * | 2/1985 | Ninomiya et al. | 348/620 |
| 4,794,454 A | | 12/1988 | Sugiyama et al. | |
| 5,365,281 A | * | 11/1994 | Ko et al. | 348/700 |

FOREIGN PATENT DOCUMENTS

| JP | 6390987 | 4/1988 |
|---|---|---|
| JP | 3220889 | 9/1991 |
| JP | 9-18746 | * 1/1997 |

* cited by examiner

*Primary Examiner*—Sherrie Hsia
(74) *Attorney, Agent, or Firm*—Birch, Stewart, Kolasch & Birch, LLP (57) ABSTRACT

A motion detecting apparatus for detecting the motion of the picture without error and realizing the motion YC separation or the motion adaptive scan-line interpolation with high accuracy is realized by correcting the motion amount of the pixel which is too much or too small in comparison with the peripheral pixels for the signal obtained by subtracting the output of the vertical edge detecting circuit for detecting the slow motion of the picture signal in the vertical direction from the combined outputs from the first detecting circuit for detecting motion information of the luminance signal low-pass component and from the second detecting circuit for detecting motion information of the color signal in the picture signal, and then adding the output of the horizontal edge detecting circuit for detecting the slow motion of the picture signal in the horizontal direction.

7 Claims, 10 Drawing Sheets

CONVENTIONAL ART

MOTION DETECTING APPARATUS FOR DETECTING MOTION INFORMATION OF PICTURE WITHIN SIGNAL

BACKGROUND OF THE INVENTION

1. Field of the Invention

The present invention relates to a motion adaptive YC separation apparatus for separating a luminance signal (hereinafter referred to as Y-signal or simply as Y) and a color signal (hereinafter referred to as C signal or simply as C) from a composite television signal (hereinafter referred to as V-signals) in which the color signal is frequency multiplexed on the high frequency area of the luminance signal, and more specifically, to a motion detecting apparatus suitable for detecting the motion in a motion adaptive scan-line interpolating apparatus for converting the television signal from interlace scan to sequential scan.

2. Description of the Related Art

Many improvements have been made for a motion adaptive process aiming at improvement of picture quality on the current color television. The motion adaptive process means a process to detect the motion of the picture locally by the motion detecting circuit and to switch-over between the still picture process that is suitable for the still picture and the moving picture process that is suitable for the moving picture adaptationally according to detected motions. The primary motion adaptive process in the current color television includes a motion adaptive YC separation process and a motion adaptive scan-line interpolation, and various signal process circuits for improving the picture quality by the use of a delay circuit having a delay time that is the same as the vertical scanning frequency of the television signal or higher (hereinafter simply referred to as delay circuit) has been proposed with the development of the mass storage digital memory.

In some of video signals that are transmitted or accumulated in the form of three system component signal including a luminance signal and two types of color difference signals used in, for example, a digital television broadcast or in consumer-oriented DVD players and that employ interlace scanning, a signal processing circuit that performs motion adaptive scan-line interpolation is used as described above.

In addition, when displaying a television signal of interlace scanning on the display device of dot matrix type such as a liquid crystal panel or a plasma display, there are cases where the signal processing circuit that performs motion adaptive scan-line interpolation is used.

The motion adaptive YC separation process removes the cross component elements such as cross color or dot scroll completely by separating Y signal by taking sum of the frames and C signal by taking difference between the frames when it is determined to be a still picture in accordance with the amount of the motion detected by the motion detecting circuit. When it is determined to be a moving picture, Y signal and C signal are separated by intra-field process.

The motion adaptive scan-line interpolating process performs the inter-field interpolation to remove line flickers when it is determined to be a still picture according to the amount of motion detected by the motion detecting circuit in the same manner as described above, for the purpose of converting interlace signal to sequential scan signal. When it is determined to be a moving picture, inter-field interpolation is performed.

The accuracy of motion detection of the motion detecting circuit in the above-described motion adaptive process has a significant effect on the quality of reproduced picture. The error in motion detection may be classified into two types as follows.

(1) Detection Error: a part of a still picture is determined to be a moving picture and moving picture process is performed.

(2) Detection failure: a part of a moving picture is determined to be a still picture and still picture process is performed.

Out of these two types of errors, "Detection failure" deteriorates the picture quality significantly, and thus the motion detecting circuit that prevents detection failures as much as possible has been proposed.

Figure 9:
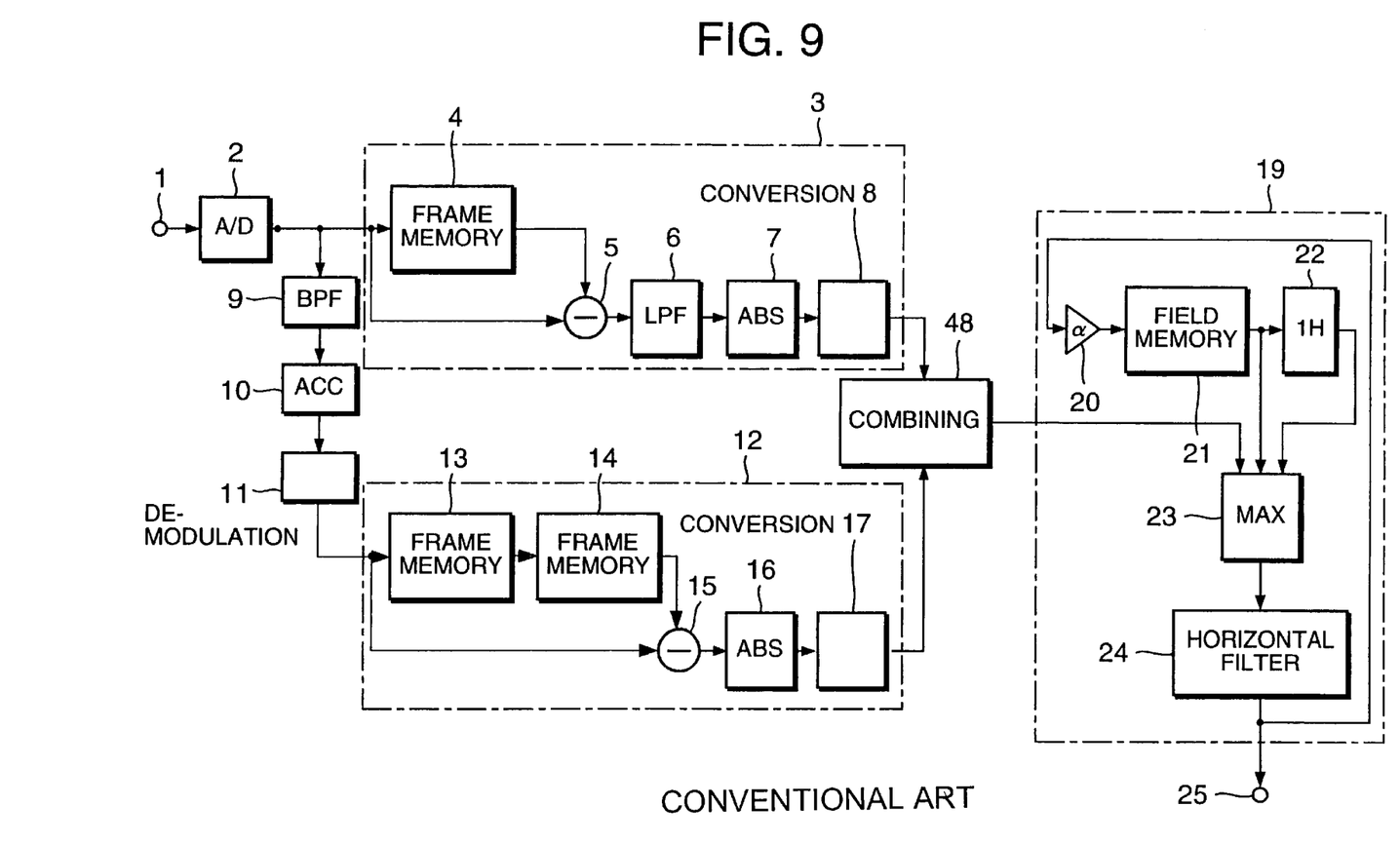
FIG. 9 is a block diagram showing an example of the motion detecting circuit of the related art.

FIG. 9 is a block circuit diagram showing an example of the motion detecting circuit in the related art shown in Japanese Patent Laid-Open No. 90987/1988. This example is based on the premise that input signal is V-signal.

Figure 10:
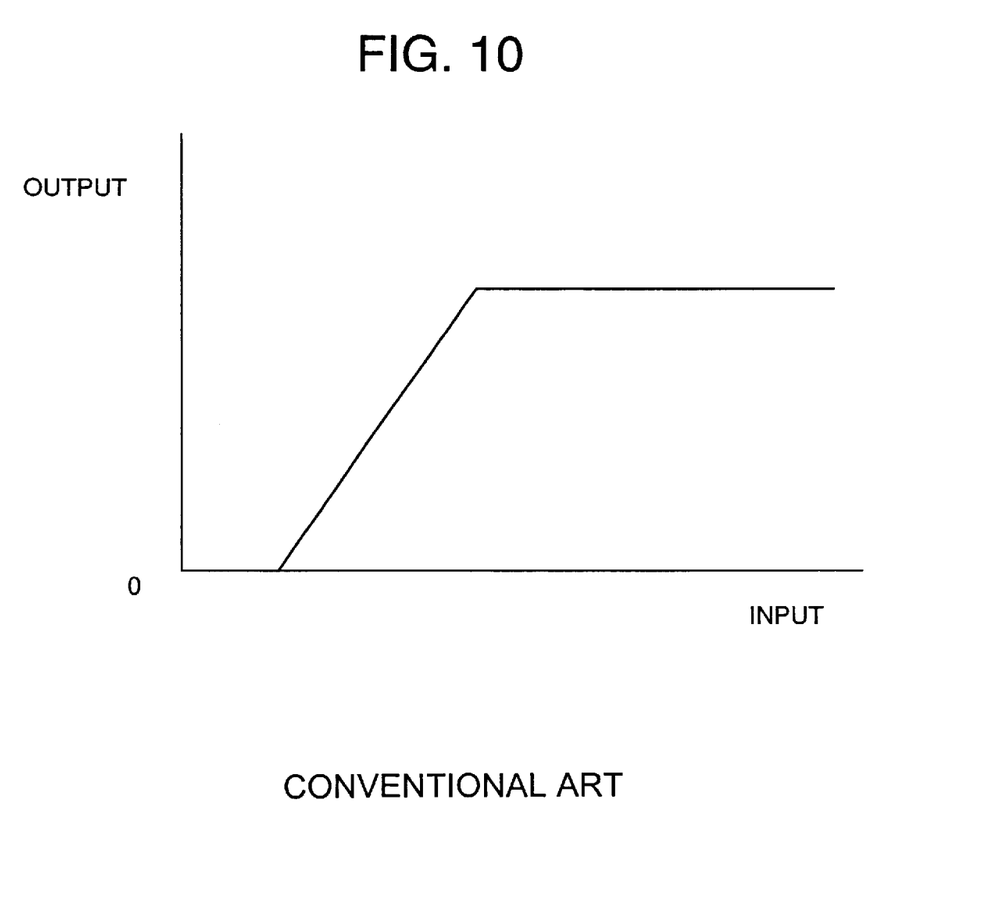
FIG. 10 is a drawing showing the input/output characteristics of the converting circuit of the motion detecting circuit according to the related art.

In FIG. 9, NTSC (National Television System Committee) system analogue V-signal incoming through the input terminal 1 is converted into a digital signal at analogue/digital conversion circuit (hereinafter referred to as ADC) 2. The digitized V-signal is fed to the first detecting circuit 3 to detect the motion of the Y-signal low frequency component. In the first detecting circuit 3, digitized V-signal is fed to the first frame memory 4 and then a signal delayed by one frame and a signal fed into the frame memory 4 are supplied to the subtraction circuit 5 to obtain a difference signal across one frame. Then, the output signal from the subtraction circuit 5 is fed to the low-pass filter (hereinafter referred o as LPF) 6 to remove the color signal band, so that motion information of Y-signal low pass component can be obtained in the output of LPF 6. At this time, it is determined to be a still picture when the output of LPF 6 is zero, and to be a moving picture when the output is the value other than zero. The output signal of LPF 6 has polarities of plus and minus, it is fed to the absolute value circuit 7 to obtain an absolute value. The output of the absolute value 7 is a conversion circuit 8, and is converted into non-linear shape by the I/O characteristics as shown in FIG. 10, and input of low level is converted into the output of zero to remove the noise effect.

On the other hand, a digitized V-signal from ADC 2 is fed to the band-pass filter (hereinafter referred to as BPF) 9 to obtain a signal in color signal band. By the action of ACC operated so as to maintain the level of burst signal contained in the output signal of BPF 9 constant, the output of the amplification circuit 10 for ACC contains a constant signal in which the variation of color signal level caused by the frequency characteristics of the transmission path is corrected. Thereafter, the color signal is demodulated by demodulation circuit 11, which works to cancel the inversion of the phase of the color width carrier between frames. The output of the demodulation circuit 11 is fed to the second detecting circuit 12 to detect the motion of the signal in the color signal band.

In the first place, the output signal of the modulation circuit 11 is fed to the second frame memory 13 to delay by one frame, and then fed to the third frame memory 14 to delay by another frame. Then, the output signal of the demodulation circuit 11 and the signal delayed by two frames by the frame memories 13 and 14 are fed to the subtraction circuit 15 to obtain the difference signal across two frames. Two signals two frames away from each other are identical in the phase of high frequency components of Y-signal and C-signal. In the case of a still picture, the difference across two frames is zero, and thus when the difference signal across two frames is a value other than zero, it is determined to be a moving picture. Moreover, the absolute value circuit 16 and the conversion circuit 17 operate in the same manner as the absolute circuit 7 and the conversion circuit 8 respectively.

The output signals of the first detecting circuit 3 and of the second detecting circuit 12 described above are combined by feeding them to the combining circuit 18. Thereby, the output of the combining circuit 18 contains motion information of signals across the whole band of V-signal. The combining circuit 18 can be implemented by selecting a lager signal out of two input signals.

By feeding the output signal of the combining circuit 18 into the spatio-temporal filter circuit 19 and using motion information of certain pixels being spatio-temporally around a certain pixel together, erroneous detection of rapid motion of the object is prevented. In the spatio-temporal filter circuit 19, the output signal of the combining circuit 18 and the output of the spatio-temporal filter circuit 19 are multiplied by $\alpha$ ($0<\alpha<1$) in the coefficient circuit 20, and then the maximum value of signals delayed by 262 H period and 263 H period is obtained by the field memory 21 and the line memory 22 in the maximum value circuit 23, and then the filtering process in the horizontal direction is carried out by the horizontal filter circuit 24. With this procedure, vertical and horizontal motion information of a certain pixel and motion information of the past pixel can be referenced. Since the spatio-temporal filter circuit of this example is a feedback type, motion information of the pixel in the range determined by the coefficient $\alpha$ can be referenced. For example, when $\alpha$ is closer to 1, the range that can reference is wide and when $\alpha$ is closer to zero, that range becomes narrower.

In this example, the motion of the signal across the whole band of V-signal is obtained by combining the output of the first detecting circuit 3 and the output of the second detecting circuit 12 in the combining circuit 18. In addition, the erroneous detection of the rapid motion of the object is prevented by filtering motion information in the spatio-temporal filter circuit 19. The motion of the picture is detected with high accuracy in this way.

The motion detecting apparatus of the related art is constructed in such a manner that the motion of the picture is detected by the first detecting circuit for detecting motion of the picture based on the lower frequency component in the difference signal across one frame of V-signal and the second detecting circuit based on the difference signal across two frames, and the output signals from said two detecting circuits is combined, and then the filtering process is carried out by means of spatio-temporal filtering circuit employing a field memory.

In this arrangement, there are recognized disadvantages in that when a scene including characters or fine pictures or patterns are taken by a handy camera, slight shaking of camera at the time of shooting causes a still picture to be determined as if it is partially a moving picture, and in addition, a filtering process by the spatio-temporal filter circuit makes the erroneous motion detection spread over the temporal space.

SUMMARY OF THE INVENTION

With such circumstances in view, it is an object of the present invention to provide a detecting apparatus in which motion information of the signal across the whole band of V-signal is detected and the picture of rapid motion is also detected accurately, and when the erroneous detection is made locally, motion of the picture can be detected accurately without unnaturalness by eliminating the effect of the filtering process performed by the spatio-temporal filter circuit. It is another object of the invention to provide a motion detecting apparatus for achieving the same effect also for a component signal across the whole band.

The motion detecting apparatus according to the first invention comprises: a motion detecting circuit for detecting the motion of the picture signals according to the differential across at least one frame; a vertical edge detecting circuit for detecting slow motion of the vertical profile of the picture signals in the horizontal direction; a horizontal edge detecting circuit for detecting slow motion of the horizontal profile of the picture signals in the vertical direction; a motion information detecting circuit for obtaining motion information of the picture from the output of said vertical edge detecting circuit, the output of said horizontal edge detecting circuit, and the output of said motion detecting circuit; a compensation circuit for compensating the rapid motion in motion information supplied from the motion information detecting circuit; and a motion information correction circuit for correcting motion information of each pixel in the picture signals obtained from the output of said compensation circuit by motion information of peripheral pixels.

A motion detecting apparatus according to the second invention provides a motion detecting apparatus as set forth in the first invention, characterized in that the vertical edge detecting circuit detects the motion of the picture signals according to the amount of amplitude of the vertical high-pass component and the correlation amount of horizontal-temporal of the high-pass component.

A motion detecting apparatus according to the third invention provides a motion detecting apparatus as set forth in the first invention, characterized in that the horizontal edge detecting circuit detects the motion of the picture signals according to the amount of amplitude of horizontal high-pass component and the correlation amount of vertical-temporal of the horizontal high-pass component.

A motion detecting apparatus according to the fourth invention provides a motion detecting apparatus as set forth in the first invention, characterized in that the motion information correction circuit corrects the amount of the motion of the pixel of interest in the picture signal according to the amount of the motion of the pixels in the proximity thereof.

A motion detecting apparatus according to the fifth invention provides a motion detecting apparatus as set forth in the first invention, characterized in that the motion information correcting circuit detects the moving picture pixels and the still picture pixels from the pixel of interest to be processed and the peripheral pixels, and corrects the motion information of said pixel of interest according to the number of the pixels of the moving picture, or of the still picture.

A motion detecting apparatus according to the sixth invention provides a motion detecting apparatus as set forth in the fifth invention, characterized in that the motion information correcting circuit performs at least a plurality of times of addition or subtraction of a prescribed amount of motion to or from said motion information of the pixel of interest according to the number of pixels for moving picture detected from the pixels of interest to be processed and the peripheral pixels thereof.

A motion detecting apparatus according to the seventh invention provides a motion detecting apparatus as set forth in the fifth invention, characterized in that the motion information correcting circuit performs at least a plurality of times of addition or subtraction of a prescribed amount of motion to or from said motion information of the pixel of interest according to the number of pixels for moving picture detected from the pixels of interest to be processed and the peripheral pixels thereof.

DETAILED DESCRIPTION OF THE PREFERRED EMBODIMENTS

Referring now to the drawings, preferred embodiments of the present invention are described in detail.
Embodiment 1

Figure 1:
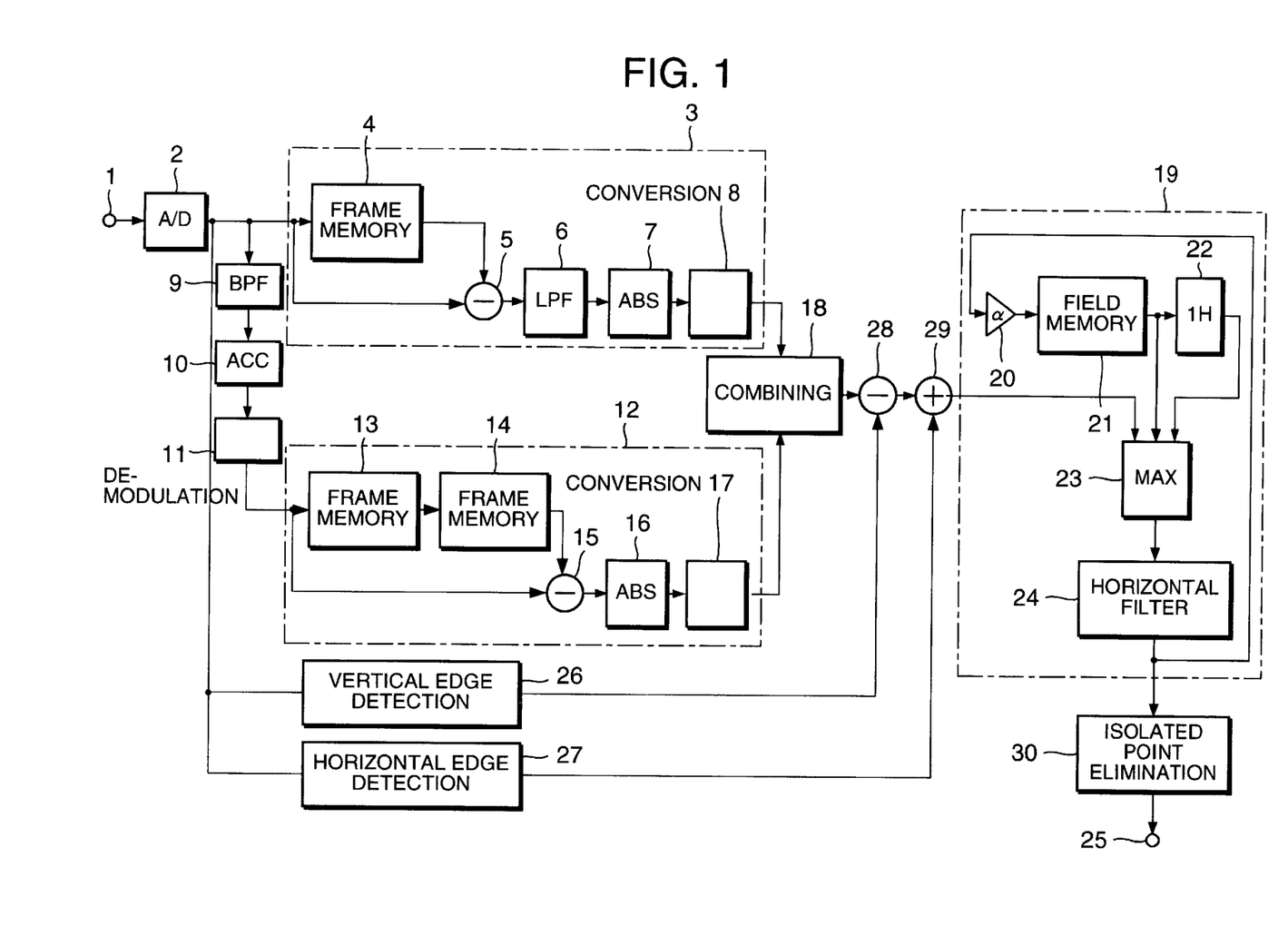
FIG. 1 is a block diagram of a motion detecting apparatus showing an embodiment 1 of the present invention.

FIG. 1 shows a motion detecting apparatus directed toward V-signals as an embodiment 1 of the present invention, and like reference numerals designates identical parts in FIG. 9. The first detecting circuit 3 for determining difference across one frame, the second detecting circuit 12 for determining difference across two frames, and the spatio-temporal filter circuit 19 work as those shown in FIG. 9. The spatio-temporal filter circuit 19 is one of compensating circuits for carrying out compensation so that correct motion information can be obtained for a quick motion or a rapid motion.

The combining circuit 18 for combining the output signals of said two types of detecting circuits works in the same manner as ones shown in FIG. 9. The motion information detecting circuit is constructed in such a manner that the output of the vertical edge detecting circuit 26 is subtracted from the output of the first combining circuit 18, and the output of the horizontal edge detecting circuit 27 is added so that motion information added with motion of the profile of the picture in the horizontal and vertical directions is obtained.

Referring now to FIG. 1, an embodiment of the present invention will be illustrated.

The decoded television signal (V-signal) fed from the input terminal 1 is fed to the first detecting circuit and the second detecting circuit for motion detection. The outputs of the first detecting circuit and the second detecting circuit are fed to the combining circuit 18 to be combined. The output of the combining circuit 18 is fed to the first input of the subtracter 28.

The V-signal from the input terminal 1 is fed to the vertical edge detecting circuit 26 and the horizontal edge detecting circuit 27. The vertical edge detecting circuit 26 detects the slow horizontal motion of the vertical edge (vertical edge means a profile close to the vertical line) of the picture in the V-signal. The horizontal edge detecting circuit 27 detects the slow vertical motion of the horizontal edge (horizontal edge means the profile close to the lateral line) of the picture in V-signal.

The output of the vertical edge detecting circuit 26 is fed to the second input of the subtracter 28 and subtracted from the output of the combining circuit 18. The output of the subtracter 28 is fed to the first input of the adder 29. The output of the horizontal edge detecting circuit 27 is fed to the second input of the adder 29 and added to the output of the subtracter 28. The output of the adder 29 is fed to the spatio-temporal filter circuit 19. The output of the spatio-temporal filter circuit 19 is fed to the input of the isolated point eliminating circuit 30. The output of the isolated point eliminating circuit 30 is fed from the output 25 as a detected motion amount.

The isolated point eliminating circuit 30 corrects the motion amount (motion information) of the pixel when the motion amount of the respective pixels in the video signal is extremely larger or smaller than the motion amount of the peripheral pixels.

Correction of the motion amount of the pixels is performed based on the motion amount of the pixels around the pixel of interest to be processed in the isolated point eliminating circuit 30. Detailed description will be given later. In this case, the isolated point eliminating circuit 30 constitutes the motion information correcting circuit.

Figure 2:
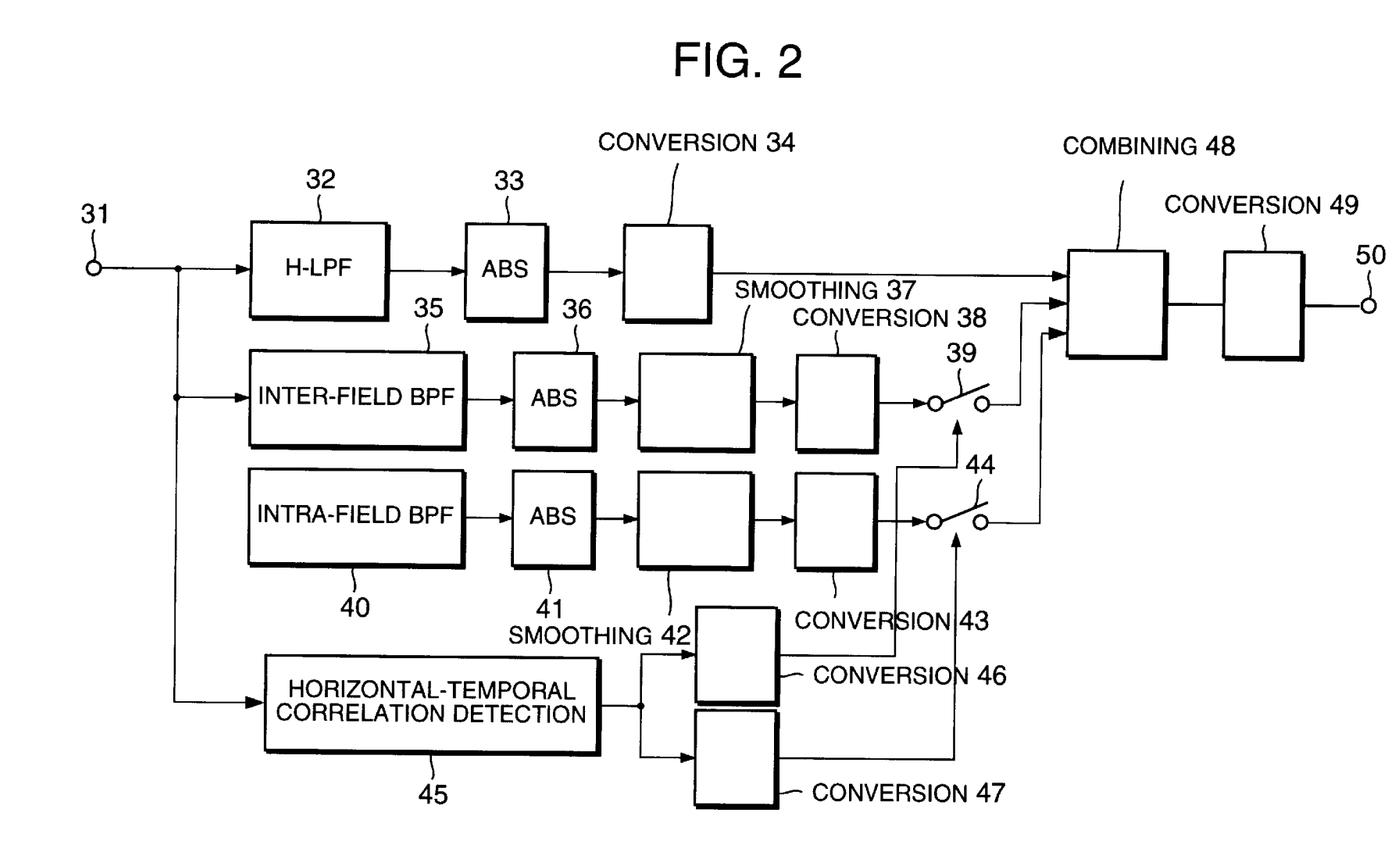
FIG. 2 is a block diagram showing an example of the vertical edge detecting portion of the motion detecting apparatus according to an embodiment 1 of the present invention.

FIG. 2 shows an embodiment of the vertical edge detecting circuit 26. In FIG. 2, the input terminal 31 receives V-signal digitized by ACD 2 of FIG. 1. The horizontal LPF 32 allows only the horizontal low-pass components of V-signal to pass. The absolute value circuit 33 takes an absolute value of the horizontal low-pass component of V-signal. The output of the absolute value circuit 33 is subjected to a suitable gain adjustment in the converting circuit 34.

On the other hand, the inter-field vertical BPF 35 is a vertical BPF obtained by the calculation between the scan-lines across two fields. The inter-field vertical BPF 35 can yield a vertical profile component at high vertical frequency. The output of the inter-field vertical BPF 35 (vertical high-pass component) is changed into an absolute value in the absolute value circuit 36. The output of the absolute value circuit 36 is smoothed by the horizontal calculation in the smoothing circuit 37. The output of the smoothing circuit 37 is subjected to a suitable gain adjustment in the converting circuit 38.

Likewise, the intra-field vertical BPF 40 is a vertical BPF obtained by the calculation between the scan-lines in the field. The intra-field vertical BPF 40 in the field can yield a vertical profile component at low vertical frequency. The output of the intra-field BPF 40 (vertical low pass component) is changed into an absolute value in the absolute value circuit 41. The output of the absolute value circuit 41 is smoothed by the horizontal calculation in the smoothing circuit 42. The output of the smoothing circuit 42 is subjected to a suitable gain adjustment in the converting circuit 43.

Figure 3:
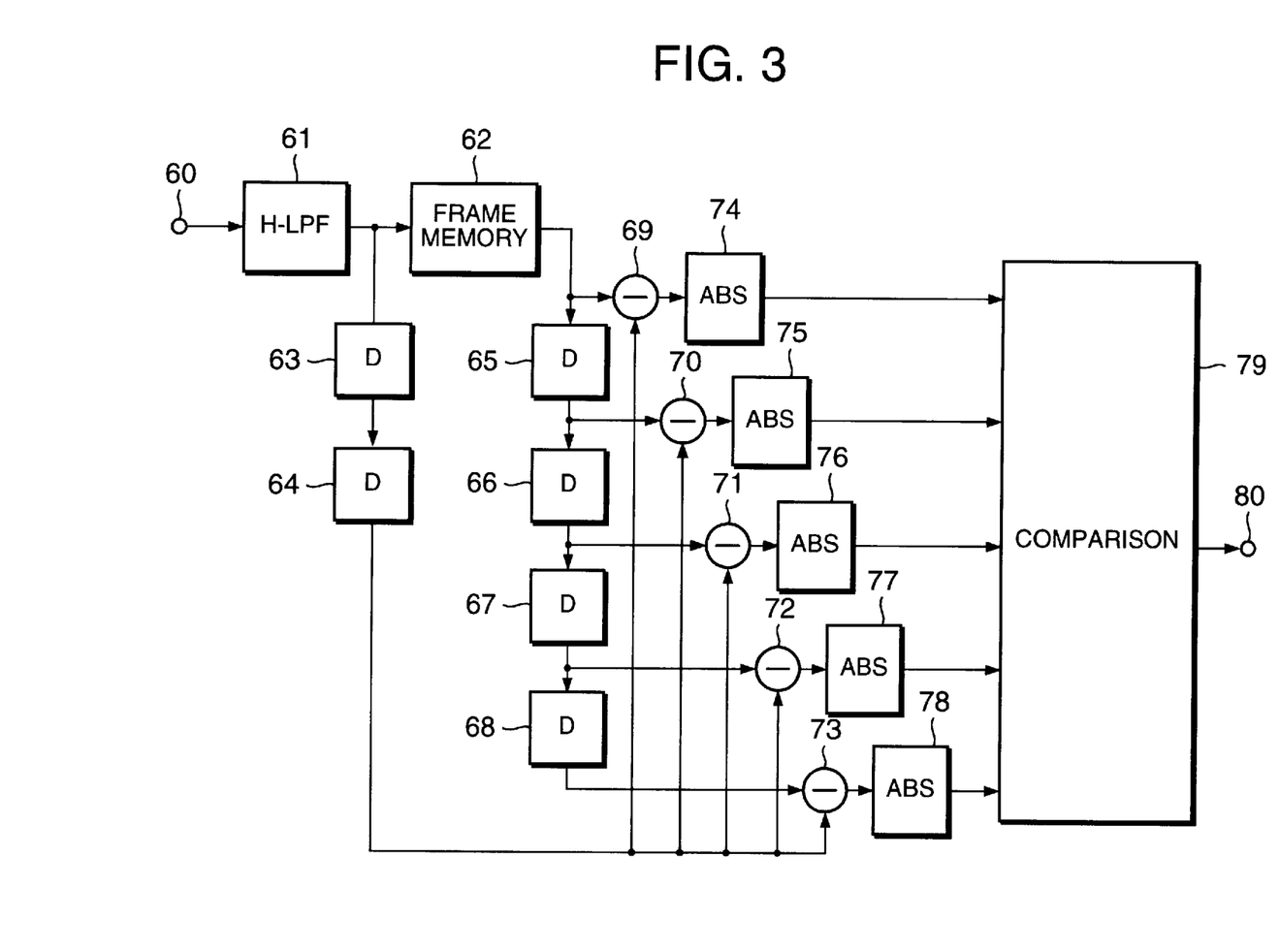
FIG. 3 is a block diagram showing an example of the horizontal-temporal correlation detecting portion of the motion detecting apparatus according to an embodiment 1 of the present invention.

The horizontal-temporal correlation detecting circuit 45 is constructed for example as shown in FIG. 3, and detects that the image is moving horizontally and slowly. The description of the action of the horizontal-temporal correlation detecting circuit 45 will be given later.

The output of the horizontal-temporal correlation detecting circuit 45 is subjected to a suitable gain adjustment in the converting circuit 46 and when the horizontal correlation is strong, the switch 39 controls to switch the output of the converting circuit 38 to be passed. Likewise, the output of the horizontal correlation detecting circuit 45 is subjected to a suitable gain adjustment in the converting circuit 47 and when the horizontal correlation is strong, the switch 44 controls to switch the output of the converting circuit 43 to be passed. The vertical frequency band in which the vertical edge is detected can be adjusted by the gain adjustment in the converting circuits 46 and 47. The combining circuit 48 combines the output of the converting circuit 34, the output of the switch 39, and the output of the switch 44 so that the output signal of the combining circuit 48 yields the values other than zero only when the vertical edge that has only horizontal low-pass components within a specific frequency band moves slowly in the horizontal direction. The converting circuit 49 performs the gain adjustment of the output of the combining circuit 48. The output terminal 50 feeds the output of the converting circuit 49 as the second input of the subtracter 28 shown in FIG. 1.

FIG. 3 is an example of the circuit structure of the horizontal-temporal correlation detecting circuit 45. In FIG. 3, the input terminal 60 receives a V-signal digitized by ADC 2 of FIG. 1. The horizontal LPF 61 allows only the horizontal low-pass component of the V-signal to pass. The frame memory 62 delays the output of the horizontal LPF 61 by one frame. The pixel delay circuits 63 and 64 delay the output of the horizontal LPF 61 by two pixels in the horizontal direction. The pixel delay circuits 65 to 68 delay the output of the frame memory 62 by one pixel each. The subtracters 69 to 73 perform subtraction between the output of the pixel delay circuit 64 and the outputs of the frame memory 62 and of the pixel delay circuits 65 to 68. The absolute value circuits 74 to 78 take the absolute values of the outputs of the subtracters 69 to 73 respectively. The comparison circuit 79 compares and selects the smallest value from the absolute value circuits 74 to 78 and feeds the selected value from the output terminal 80.

Though the example shown in FIG. 3 shows the case where the picture moves at the horizontal speed within two pixels per one frame is defined to be a slow motion, it is also possible to employ a horizontal-temporal correlation detecting circuit that determines the faster motion also as a slow motion depending on the construction of FIG. 2 or the characteristics of the converting circuit.

Figure 4:
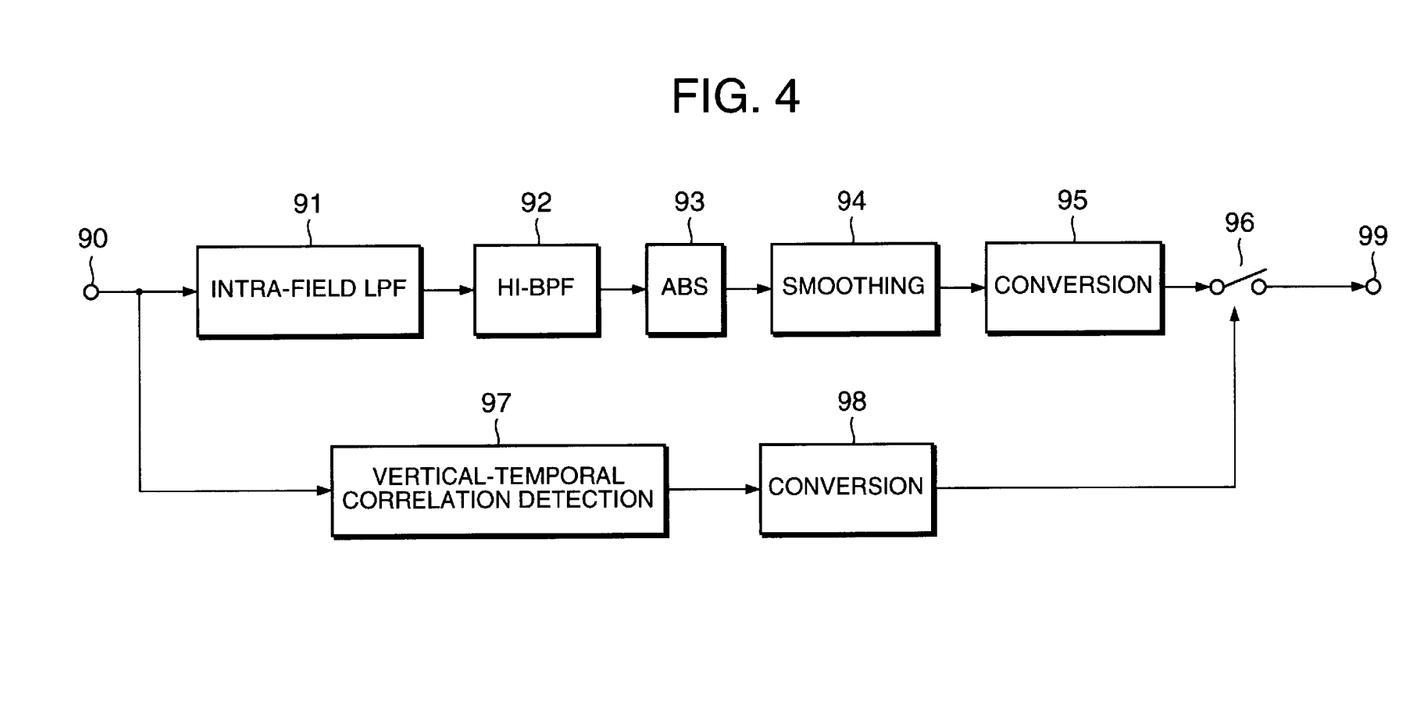
FIG. 4 is a block diagram showing an example of the horizontal edge detecting portion of the motion detecting apparatus according to an embodiment 1 of the present invention.

FIG. 4 is an example of the circuit construction of the horizontal edge detecting circuit 27 shown in FIG. 1. In FIG. 4, the input terminal 90 receives the V-signal digitized by ADC 2 shown in FIG. 1. The intra-field LPF 91 allows only the vertical low-pass component to pass by the calculation between the scan-lines in the field. The horizontal BPF 92 allows only the horizontal high-pass component of the output of the intra-field LPF to pass. The absolute value circuit 93 takes the absolute value of the output of the horizontal BPF 92. The smoothing circuit 94 smoothens the absolute value circuit 93 in the horizontal direction. The output of the smoothing circuit 94 is subjected to a suitable gain adjustment in the converting circuit 95. On the other hand, the vertical-temporal correlation detecting circuit 97 is constructed as in FIG. 5, for example, and detects that the image is moving slowly in the vertical direction. The output of the vertical-temporal correlation detecting circuit 97 is subjected to a suitable gain adjustment in the converting circuit 98 and when the vertical correlation is strong, the switch 96 controls to switch the output of the converting circuit 95 to be passed. The output terminal 99 feeds the output of the switch 96 as the second input of the adder 29 in FIG. 1.

Figure 5:
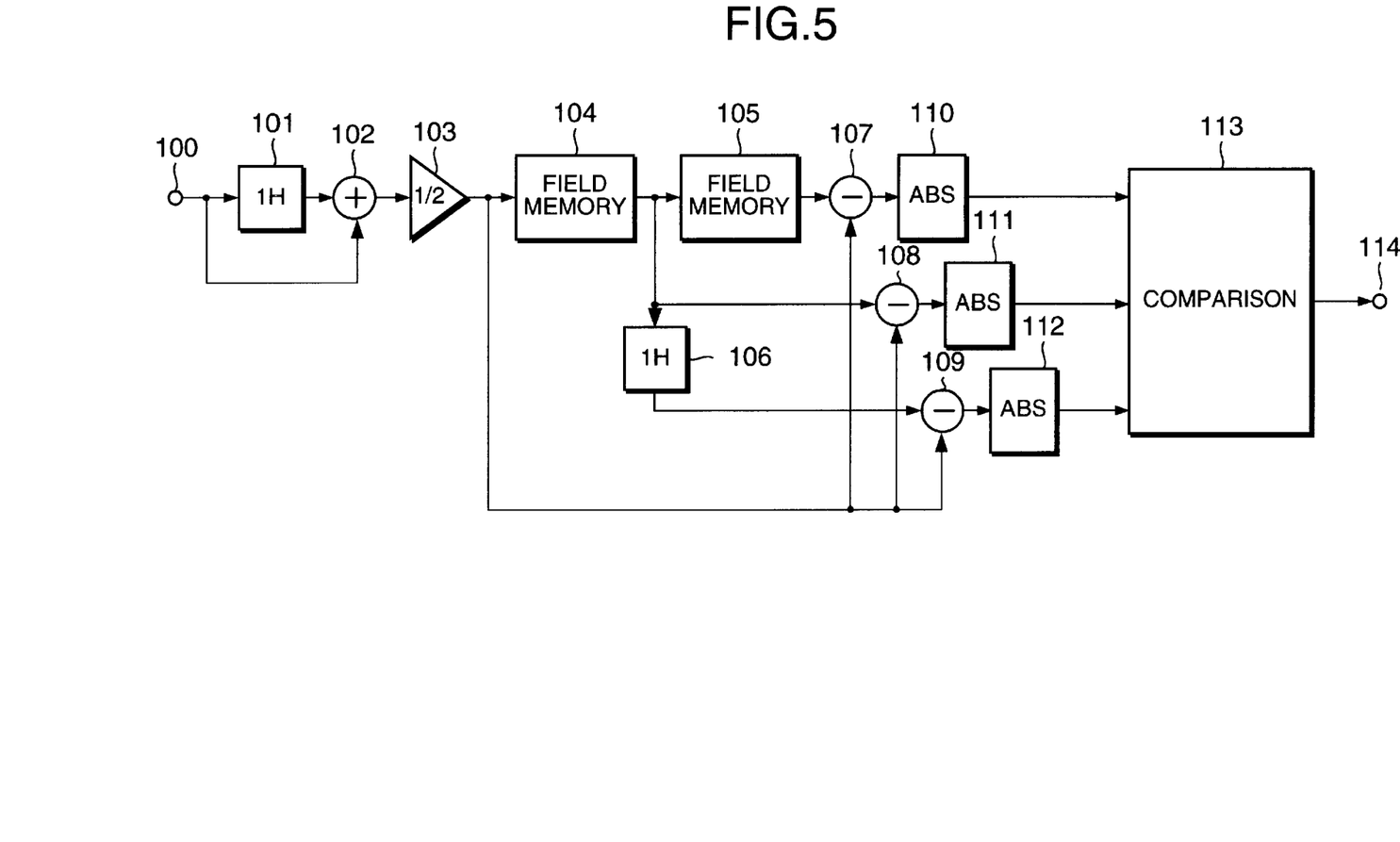
FIG. 5 is a block diagram showing an example of the vertical-temporal correlation detecting portion of the motion detecting apparatus according to an embodiment 1 of the present invention.

FIG. 5 is an example of the circuit construction of the vertical-temporal correlation detecting circuit 97. In FIG. 5, the input terminal 100 receives the V-signal digitized by ADC 2 shown in FIG. 1. The 1-line delay circuit 101, the adder 102, and the divider 103 constitute the vertical LPF in the field. The vertical LPF allows only the vertical low-pass component of the V-signal to pass. The field memory 104 delays the output of the divider 103 by 262 H. The field memory 105 delays the output of the field memory 104 by additional 263 H. The 1-line delay circuit 106 delays the output of the field memory 104 by another 1 H. The subtracter 107 subtracts the output of the divider 103 from the output of the field memory 105. The subtracter 108 subtracts the output of the divider 103 from the output of the field memory 104. The subtracter 109 subtracts the output of the divider 103 from the output of the 1-line delay circuit 106. The absolute value circuits 110, 111, and 112 takes the absolute values of the outputs of the subtracters 107, 108, and 109 respectively. The comparison circuit 113 determines that any one of correlations is strong when any one of the outputs of the absolute value circuits 110, 111, and 112 is smaller than the specific fixed value, and supplies a control signal from the output terminal 114 to shut down the switch 96 shown in FIG. 4.

Figure 6:
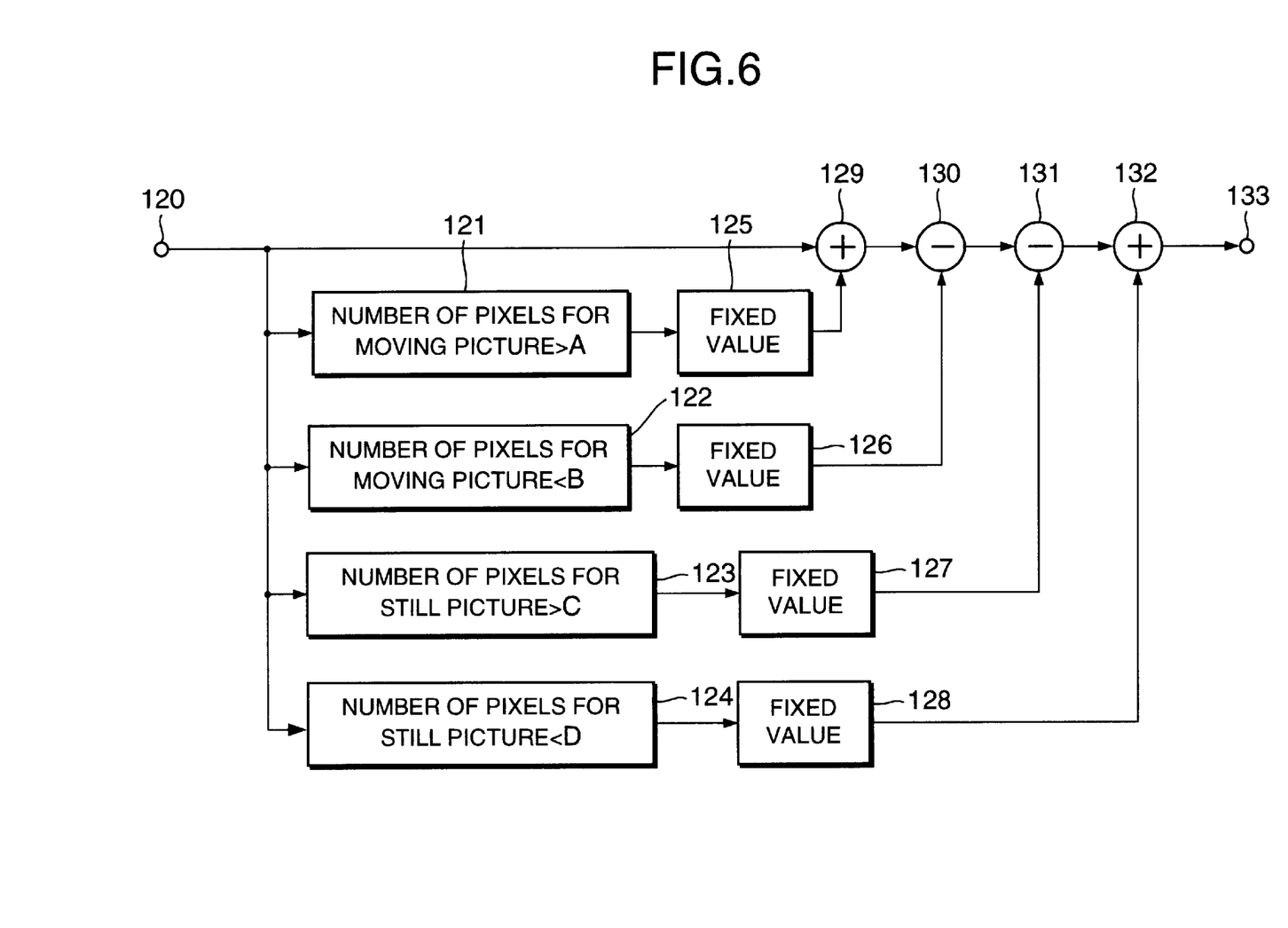
FIG. 6 is a block diagram showing an example of the isolated point eliminating circuit of the motion detecting apparatus of an embodiment 1 of the present invention.

FIG. 6 is an example of the circuit construction of the isolated point eliminating circuit 30. In FIG. 6, the input terminal 120 receives the output of the spatio-temporal filter 19. The motion pixel number accumulation circuits 121 to 124 include a pixel of interest, and works to compare the motion amount of the peripheral pixels in the same field as the pixel of interest with the specific fixed value and accumulate the results. The term "pixel of interest" means that the pixel that is to be processed in the isolated point eliminating circuit, and all the pixels in the entered video signal are to be processed at last. The term "specific fixed value" means the value to determine if it is a pixel for the moving picture or a pixel for the still picture, and thus the pixel of interest and the peripheral pixels are determined if they are pixels for the moving picture or pixels for the still picture depending on this specific value.

For example, the motion amount of 9 pixels comprising pixels of interest constituted by horizontal three pixels and vertical three lines is compared with the specific fixed value, and the number of pixels of which the motion amount is smaller than the fixed value is determined to be the pixel number for the still picture, and the number of pixels of which the motion amount is larger than the fixed value is determined to be the pixel number for the moving picture, then one of the numbers of pixels is accumulatively added to count the number of the pixels for the still picture or for the moving picture.

The moving picture pixel number accumulating circuit 121 compares the number of pixels for the moving picture with the threshold value A to supply a binary output. The binary output is a value representing whether the number of pixels for the moving picture is larger than A or smaller than A, from which the relation in magnitude between the number of pixels for the moving picture and the threshold value A can be seen.

When accumulative addition of nine pixels is employed, the threshold value A takes on values in the range $0 \leq A \leq 9$. The value to be added determined by the fixed value circuit 125 is added to the motion amount entered from the input terminal 120 in the adder 129 according to the output of the moving picture moving picture pixel number accumulating circuit 121.

Figure 7A:
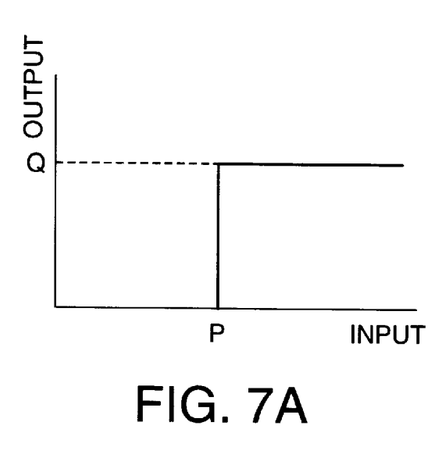
FIGS. 7A and 7B are characteristic diagrams showing the actions of a moving picture pixel number accumulating circuit and the still picture pixel number accumulating circuit and the fixed value circuit.

FIG. 7A is a characteristics drawing showing the actions of the moving picture pixel number accumulating circuit 121 and the fixed value circuit 125. In FIG. 7A, assuming P=A, when the accumulated value of moving picture pixels is larger than P, the value of Q is added to the motion amount in the adder 129. In other words, when the number of pixels for the moving picture is larger than the threshold value A in the moving pictures pixel number accumulating circuit 121, the fixed value Q from the fixed value circuit 125 is added to the motion amount.

The moving picture pixel number accumulating circuit 122 compares the number of pixel for the moving picture with the threshold value B and feeds the binary moving picture output. The relation in magnitude between the number of pixels for the moving picture and the threshold value B can be seen. The value to be subtracted determined by the fixed value circuit 126 is subtracted from the output of the adder 129 in the subtracter 130 according to the output of the moving picture pixel number accumulating circuit 122.

Figure 7B:
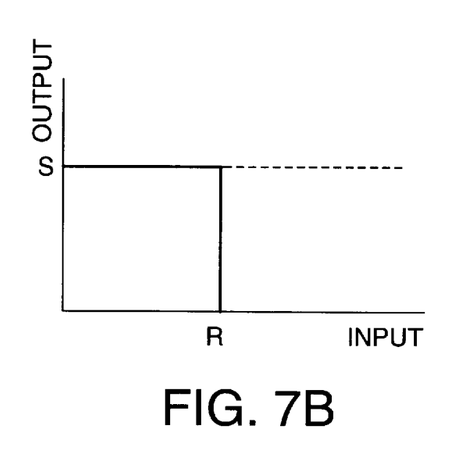

FIG. 7B is a characteristics drawing showing the actions of the moving picture pixel number accumulating circuit 122 and the fixed value circuit 126. In FIG. 7B, assuming R=B, when the accumulated value of moving picture pixels is smaller than R, the value of S is subtracted from the motion amount in the subtracter 130. Therefore, in the moving picture pixel number accumulating circuit 122, when the number of pixels for the moving picture is smaller than the threshold value B, the fixed value Q from the fixed value circuit 126 is entered into the subtracter 130 and the subtraction from the output of the adder 129 is performed.

The still picture pixel number accumulating circuit 123 compares the number of pixels for the still picture with the threshold value C and feeds the binary output. The binary output shows the relation in magnitude between the number of pixels for the still picture and the threshold value C can be seen. The value to be subtracted determined by the fixed value circuit 127 is subtracted from the output of the subtracter 130 in the subtracter 131 according to the output of the still picture pixel number accumulating circuit 123. Here, the output of the fixed value circuit 127 is entered into the subtracter 131 when the number of pixels for the still picture is larger than the threshold value C.

The still picture pixel number accumulating circuit 124 compares the number of pixels for the still picture with the threshold value D and feeds the binary output. The binary output shows the relation in magnitude between the number of pixels for the still picture and the threshold value D can be seen. The subtraction value determined by the fixed value circuit 128 is added to the output of the adder 130 in the adder 132 according to the output of the still picture pixel number accumulating circuit 124. Here, the fixed value is entered into the adder 132 from the fixed value circuit 128 when the number of pixels for the still picture is smaller than the threshold value D, and added to the output from the subtracter 131.

When accumulative addition of nine pixels as shown above is employed also for the threshold values B, C, and D as in the case of A, these threshold values can take on values in the range $0 \leq B \leq 9$, $0 \leq C \leq 9$, and $0 \leq D \leq 9$ respectively. In the subtracter 131 and the adder 132, subtraction and addition are also performed according to the characteristics shown in FIG. 7A, 7B. In other words, in the still picture pixel number accumulation circuit 123, assuming P=C in FIG. 7A, when he still picture pixel number is larger than the threshold value C(=P), the fixed value Q is fed from the fixed value circuit 127. In addition, in the still picture pixel number accumulation circuit 124, assuming R=D in FIG. 7B, when the still picture pixel number is smaller than the threshold value D (=R), the fixed value S is fed from the fixed value circuit 128.

In the isolated point eliminating circuit 30, any one or more of four additions or subtractions by the adder 129, the subtracter 130, 131, and adder 132 may be deleted. The number or the positions of the peripheral pixels may be increased or decreased according to the effect of the isolated point elimination.

The isolated point elimination circuit 30 has an effect of decreasing the isolated points in motion detection, and the motion detection signals in the range of $0 \leq MD \leq 1$ are entered into the input terminal 120 and fed from the output terminal 133 (MD is a detected motion amount). Therefore, it is preferable that X value in the range of $0 \leq X \leq 1$ is added and subtracted also for the adder 129, 132 and the subtracter 130, 131. When the value is zero or below, it must be clipped at zero, and when the value is one or more, it must be clipped at one.

The reason why two moving picture pixel number accumulation circuits 121 and 122, or two still picture pixel number accumulation circuits 123, 124 are provided is that a plurality of conditions determined by the values of A, B, C and D in the respective circuit may be satisfied depending on the values of A, B, C and D. It may cause the erroneous detection, and in this case, the accuracy of detection by be enhanced by repeating addition and subtraction according to the respective conditions. ("According to the respective conditions . . . " means that the respective conditions are satisfied depending on the set values of A, B, C, and D, and at that time the addition and subtraction of 129 to 132 are repeated.)

For example, in the still picture pixel number accumulating circuit, when the number of pixels for the still picture is larger than C, there is high probability of being preferable to have the result of the motion detection for the pixel of interest closer to the moving picture in comparison with the actual result. On the other hand, when the number of pixels for the still picture is smaller than D, there is high probability of being preferable to have the result of the motion detection in the pixels of interest closer to the still picture in comparison with the actual result.

In this way, depending on the set values of A, B, C, and D, when two or more conditions are satisfied (though there is no contradiction logically), the erroneous detection may arise. In such a case, by repeating adding and subtracting by means of adders 129, 132 and the subtracters 130, 131, the correction by the isolating point eliminating circuit may be compensated (smoothed).

The reason why the fixed value circuits are provided at the rear stage of the moving picture pixel number accumulating circuit and the still picture pixel number accumulating circuit in the isolated point eliminating circuit 30 is to correct the value of the pixel of interest to the value closer to the moving picture or to the value closer to the sill picture by simple calculation such as addition and subtraction of the fixed value, thereby the isolated point can be eliminated.

The isolated point eliminating circuit 30 eliminates the isolated point by the pixel of interest depending on whether there are more pixels for the moving picture or more pixels for the still picture locally therearound. The isolated point means the pixel specifically in the state where the pixel of interest if the still picture even though there are more pixels for moving picture around it, or the state where the pixel of interest is moving picture even though there are more pixels for the still picture around it.

In this way, according to this embodiment, since motion information is obtained by the steps of adding or subtracting the prescribed value to or from the output obtained by the motion detecting circuit for detecting motion amount based on the differential across at least one frame is added according to the output of the vertical edge detecting circuit for detecting a slow motion of the vertical profile of the image signal in the horizontal direction and the output of the horizontal edge detecting circuit for detecting a slow motion of the horizontal profile of the image signal in the vertical direction (in other words, according to the magnitudes of the specific frequency component of the image signal and the horizontal-temporal correlation amount and the vertical-temporal correlation amount of the frequency component, or the magnitudes of the horizontal and vertical components), and then entering the obtained motion amount into the isolated point eliminating circuit, the chances of erroneous detection or detection failure may be reduced.

Embodiment 2

Figure 8:
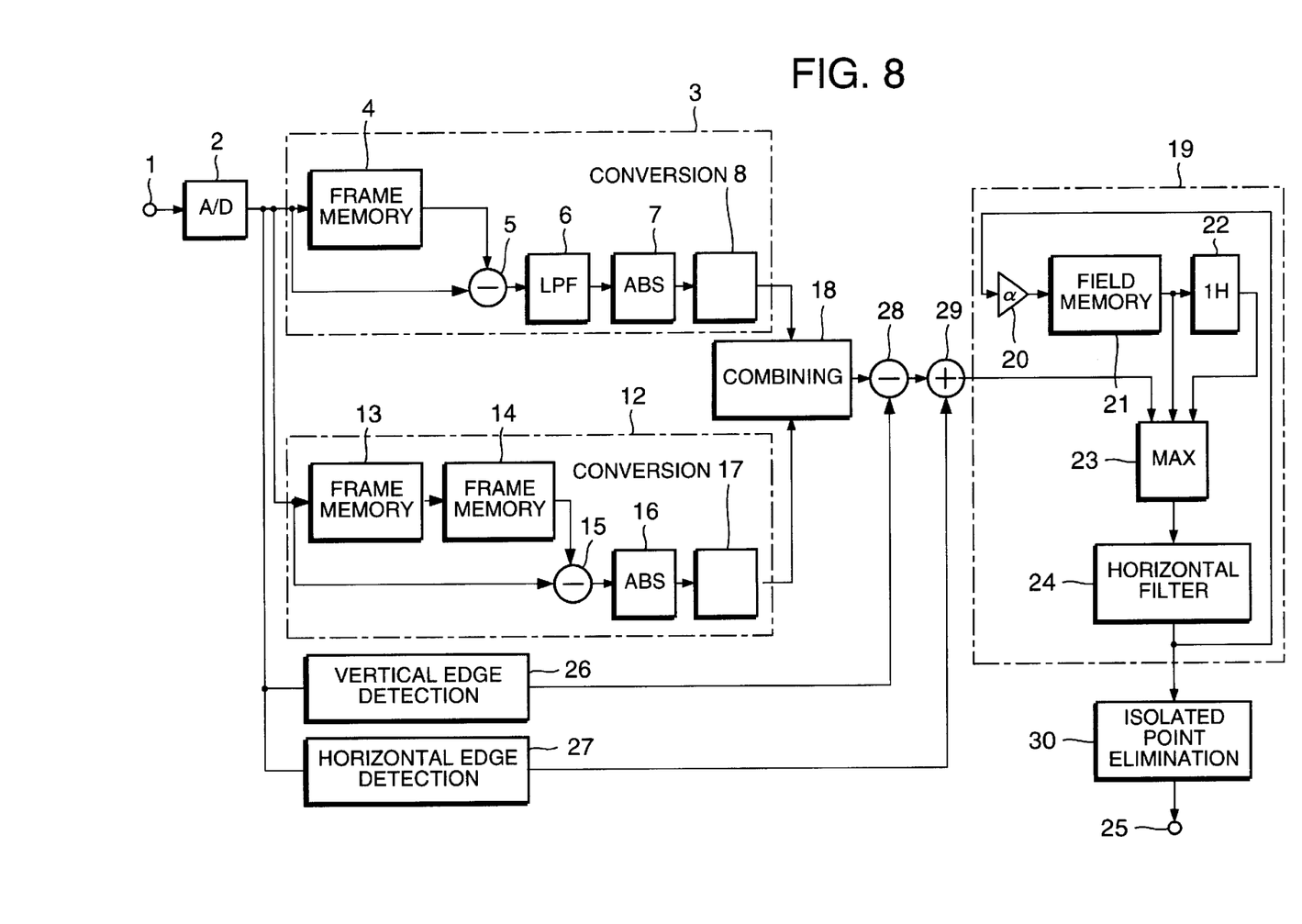
FIG. 8 is a block diagram of the motion detecting apparatus showing an embodiment 2 of the present invention.

FIG. 8 is a motion detecting apparatus according to the embodiment 2 of the present invention. This figure shows an embodiment in which the signal fed from the input terminal 1 is luminance signal (Y-signal). In FIG. 8, like reference numerals designates the identical parts in FIG. 9. The first detecting circuit 3 for determining the difference across one frame, the second detecting circuit 12 for determining the difference across two frames, and the spatio-temporal filter circuit 19 work as those shown in FIG. 6. In addition, the first combining circuit 18 for combining the output signals of the above-described two types of detecting circuit also works as the one shown in FIG. 6. In many cases, the motion detecting apparatus used for motion adaptive scan-lines interpolation is directed to the video signals such as Y-signal and the color difference signal, and thus the construction as shown in FIG. 8 is preferable to detect the motion from Y-signal for one-frame difference detection or two-frames difference detection.

In the horizontal-temporal correlative detecting circuit shown in FIG. 3 in the vertical edge detecting circuit 26 shown in FIG. 8, the horizontal LPF 61 may include Y-signal which is more gentle than V-signal in frequency characteristics, or it may even be omitted. Likewise, in the vertical-temporal correlation detecting circuit 97 shown in FIG. 5 in the horizontal edge detecting circuit 27 shown in FIG. 8, the intra-field vertical LPF 101 composed of the one-line delay circuit 101, the adder 102, and the subtracter 103 may be omitted. In the component signals as well, the effect of the present invention can be achieved for the Y-signal according to the embodiment shown in FIG. 8. In addition, adding the motion detecting apparatus for the color difference signals enhance the accuracy of the motion detection.

In the motion detecting apparatus according to the embodiment 1 and embodiment 2, though the spatio-temporal filter 19 is shown to be a feedback type, it may be a feed forward type. In the feed forward type, the same effect can be achieved by taking the maximum values of the motion amount of the current field and the motion amount of one field before.

The motion detecting apparatus of the present invention has effects as shown below.

According to the first invention, since the motion detecting apparatus comprises: a motion detecting circuit for detecting the motion of the picture signals according to the differential across at least one frame; a vertical edge detecting circuit for detecting slow motion of the vertical profile of the picture signals in the horizontal direction; a horizontal edge detecting circuit for detecting slow motion of the horizontal profile of the picture signals in the vertical direction; a motion information detecting circuit for obtaining motion information of the picture from the output of said vertical edge detecting circuit, the output of said horizontal edge detecting circuit, and the output of said motion detecting circuit; a compensation circuit for compensating the rapid motion in motion information supplied from the motion information detecting circuit; and a motion information correction circuit for correcting motion information of each pixel in the picture signals obtained from the output of said compensation circuit by motion information of peripheral pixels, and performs motion detection also taking the horizontal movement of the vertical profile or the vertical movement of the horizontal profile of the picure signal into account, motion detecting apparatus with little possibility of erroneous detection or detection failure can be provided.

According to the second invention, since the vertical edge detecting circuit detects the motion of the picture signals according to the amount of amplitude of the vertical high-pass component and the correlation amount of horizontal-temporal of the high-pass component, the erroneous detection of the motion of the vertical edge portion of the picture can further be reduced.

According to the third invention, since the horizontal edge detecting circuit detects the motion of the picture signals according to the amount of amplitude of horizontal high-pass component and the correlation amount of vertical-temporal of the horizontal high-pass component, detection failure of the motion of the horizontal edge portion of the picture can further be reduced.

According to the fourth invention, since the motion information correction circuit corrects the amount of the motion of the pixel of interest in the picture signal according to the amount of the motion of the pixels in the proximity thereof, the motion detection can be performed while taking the motion amount of the peripheral pixels into account, and thus the erroneous detection of the motion can be reduced, thereby enabling more accurate motion detection.

According to the fifth invention, since the motion information correcting circuit detects the moving picture pixels and the still picture pixels from the pixel of interest to be processed and the peripheral pixels, and corrects the motion information of said pixel of interest according to the number of the pixels of the moving picture, or of the still picture, the motion detection can be performed while taking information on whether the peripheral pixels of the pixel of interest are pixels for the moving picture or the pixels for the still picture, and thus the erroneous detection or the detection failure of the motion can further be reduced.

According to the sixth invention, since the motion information correcting circuit performs at least a plurality of times of addition or subtraction of a prescribed amount of motion to or from said motion information of the pixel of interest according to the number of pixels for moving picture detected from the pixels of interest to be processed and the peripheral pixels thereof, the erroneous detection of the motion in the pixels can be reduced even when the number of times of calculation is small, thereby ensuring reduction of the erroneous detection or the detection failure of the motion of the picture signal as a consequent.

According to the seventh invention, since the motion information correcting circuit performs at least a plurality of times of addition or subtraction of a prescribed amount of motion to or from said motion information of the pixel of interest according to the number of pixels for moving picture detected from the pixels of interest to be processed and the peripheral pixels thereof, the erroneous detection of the motion in the pixels can be reduced even when the number of times of calculation is small, thereby ensuring reduction of the erroneous detection or the detection failure of the motion of the picture signal as a consequent.

What is claimed is:

1. A motion detecting apparatus comprising:
    a motion detecting circuit for detecting the motion of the picture signals according to the differential across at least one frame;
    a vertical edge detecting circuit for detecting slow motion of the vertical profile of the picture signals in the horizontal direction;
    a horizontal edge detecting circuit for detecting slow motion of the horizontal profile of the picture signals in the vertical direction;
    a motion information detecting circuit for obtaining motion information of the picture from the output of said vertical edge detecting circuit, the output of said horizontal edge detecting circuit, and the output of said motion detecting circuit;
    a compensation circuit for compensating the rapid motion in motion information supplied from the motion information detecting circuit; and
    a motion information correction circuit for correcting motion information of each pixel in the picture signals obtained from the output of said compensation circuit by motion information of peripheral pixels.

2. A motion detecting apparatus as set forth in claim 1, characterized ifl that the vertical edge detecting circuit detects the motion of the picture signals according to the amount of amplitude of the vertical high-pass component and the correlation amount of horizontal-temporal of the high-pass component.

3. A motion detecting apparatus as set forth in claim 1, characterized in that the horizontal edge detecting circuit detects the motion of the picture signals according to the amount of amplitude of horizontal high-pass component and the correlation amount of vertical-temporal of the high-pass component.

4. A motion detecting apparatus as set forth in claim 1, characterized in that the motion information correction circuit corrects the amount of the motion of the pixel of interest in the picture signal according to the amount of the motion of the pixels in the proximity thereof.

5. A motion detecting apparatus as set forth in claim 1, characterized in that the motion information correction circuit detects the moving picture pixels and the still picture pixels from the pixel of interest to be processed and the peripheral pixels, and corrects the motion information of said pixel of interest according to the number of the pixels of the moving picture, or of the still picture.

6. A motion detecting apparatus as set forth in claim 5, characterized in that the motion information correction circuit performs at least a plurality of times of addition or subtraction of a prescribed amount of motion to or from said motion information of the pixel of interest according to the number of pixels for moving picture detected from the pixels of interest to be processed and the peripheral pixels.

7. A motion detecting apparatus as set forth in claim 5, characterized in that the motion information correction circuit performs at least a plurality of times of addition or subtraction of a prescribed amount of motion to or from said motion information of the pixel of interest according to the number of pixels for still picture detected from the pixels of interest to be processed and the peripheral pixels.

* * * * *